United States Patent
Kinoshita et al.

(10) Patent No.: US 9,252,974 B2
(45) Date of Patent: Feb. 2, 2016

(54) MAIL GATEWAY, MAIL DELIVERY METHOD, AND PROGRAM

(71) Applicant: Hitachi, Ltd., Tokyo (JP)

(72) Inventors: Masafumi Kinoshita, Sagamihara (JP); Toshiyuki Kamiya, Yokohama (JP); Takafumi Koike, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 353 days.

(21) Appl. No.: 13/746,009

(22) Filed: Jan. 21, 2013

(65) Prior Publication Data

US 2013/0198302 A1  Aug. 1, 2013

(30) Foreign Application Priority Data

Jan. 27, 2012 (JP) ................................. 2012-015507

(51) Int. Cl.
*G06F 15/16* (2006.01)
*H04L 12/58* (2006.01)

(52) U.S. Cl.
CPC ............... *H04L 12/58* (2013.01); *H04L 51/30* (2013.01)

(58) Field of Classification Search
CPC ............................... H04L 12/58; H04L 51/30
USPC .................................................. 709/206, 204
See application file for complete search history.

(56) References Cited

U.S. PATENT DOCUMENTS

| | | | |
|---|---|---|---|
| 7,155,725 | B1 | 12/2006 | Kister et al. |
| 7,162,513 | B1 | 1/2007 | Kister et al. |
| 2011/0029621 | A1* | 2/2011 | Kamiya .............. H04L 12/5875 709/206 |

FOREIGN PATENT DOCUMENTS

| | | |
|---|---|---|
| JP | 2005-524254 A | 8/2005 |
| JP | 2005-269263 A | 9/2005 |
| WO | 03/083691 A1 | 9/2003 |

* cited by examiner

*Primary Examiner* — Jude Jean Gilles
*Assistant Examiner* — Joel Mesa
(74) *Attorney, Agent, or Firm* — Volpe and Koenig, P.C.

(57) ABSTRACT

In a mail gateway, a collection part collects, for each specific information contained in a mail entered into a resending queue, statistical information of the specific information. A provisional queue creation part creates a provisional queue based on the collected number of the statistical information. The provisional queue handles a mail which has a possibility of causing congestion. This can prevent a normal queue from entering into a congestion state. Also in the mail gateway, if the congestion state is brought about in the provisional queue which performs a send of a mail containing the specific information, a mail sort part restricts an entry of a mail into the provisional queue. This can limit an influence of the congestion state only to the provisional queue.

15 Claims, 10 Drawing Sheets

FIG.6

121 Queue management information

| 601 | 602 | 603 | 604 | 605 | 606 | 607 | 608 | 609 |
|---|---|---|---|---|---|---|---|---|
| Queue ID | Queue name | Queue size | Expiration time | Retransmission time | Number of retransmissions | Transmission rate | Connection upper limit value | Restriction flag |

FIG.7

125 Group information on counting entries

| 701 | 702 | 703 | 704 | 705 | 706 | 707 | 708 | 709 | 710 |
|---|---|---|---|---|---|---|---|---|---|
| Group ID | Collection target | New queue Creation information | Upper Limit threshold | Lower Limit threshold | Upper limit number of new queues | Number of Created new queues | Control flag | Counting target flag | Option |

126 Information on counting entries

| 801 | 802 | 803 | 804 | 805 | 806 | 807 | 808 |
|---|---|---|---|---|---|---|---|
| Key Information ID | Key information | Collected number | Upper limit threshold | Lower limit threshold | Status flag | Updated date and time | Option |

116 Queue creation exclusion list

810a Key information
810b Key information

FIG.10A  Information to be collected is queue length

| Key information ID ~901 | Key information ~902 | Collected number (queue length) ~903 | Upper limit threshold (of queue length) ~904 | Lower limit threshold (of queue length) ~905 | Status flag ~906 | Updated date and time ~907 | Option (throughput and maximum value) ~908 |
|---|---|---|---|---|---|---|---|
| 0001 | AAA | 1010 | 1000 | 200 | queue created | 2011/09/20 hh:mm:ss | (20, 1000) |
| 0002 | ABC | 100 | 200 | 40 | not yet created | 2011/09/20 hh:mm:ss | (5, 100) |
| 0003 | EFG | 50 | 100 | 20 | not yet created | 2011/09/20 hh:mm:ss | (3, 80) |

FIG.10B  Information to be collected is number of timeouts

| Key information ID ~911 | Key information ~912 | Collected number (number of timeouts) ~913 | Upper limit threshold (of number of timeouts) ~914 | Lower limit threshold (of number of timeouts) ~915 | Status flag ~916 | Updated date and time ~917 | Option (Start time of timeout detection) ~918 |
|---|---|---|---|---|---|---|---|
| 0001 | AAA | 103 | 100 | 20 | queue created | 2011/09/20 hh:mm:ss | 2011/09/20 hh:mm:ss |
| 0002 | ABC | 1 | 100 | 20 | not yet created | 2011/09/20 hh:mm:ss | 2011/09/20 hh:mm:ss |
| 0003 | EFG | 2 | 100 | 20 | not yet created | 2011/09/20 hh:mm:ss | 2011/09/20 hh:mm:ss |

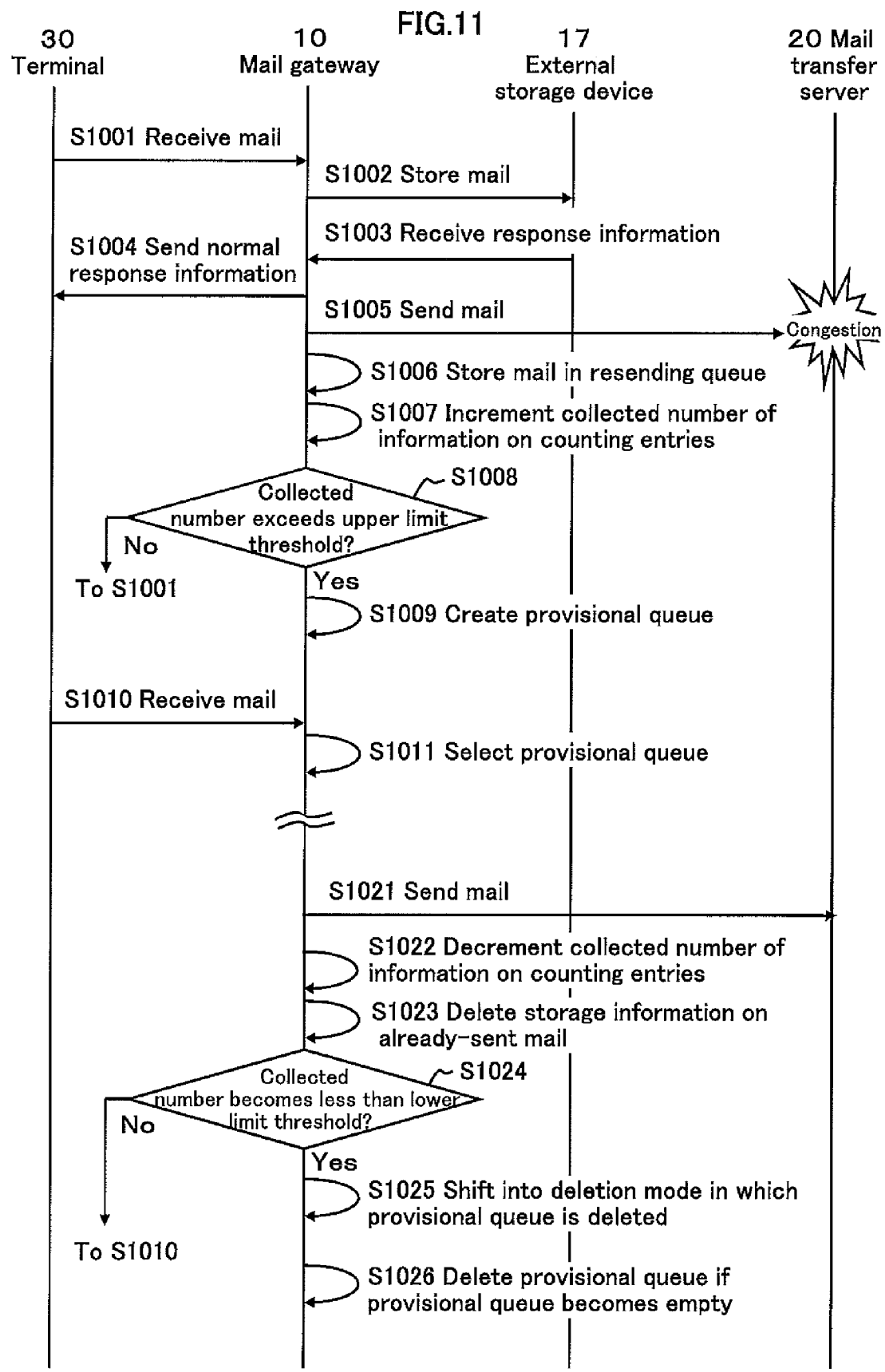

MAIL GATEWAY, MAIL DELIVERY METHOD, AND PROGRAM

CROSS REFERENCE TO RELATED APPLICATIONS

This application claims the benefit of Japanese Patent Application No. 2012-015507 filed on Jan. 27, 2012, the disclosure of which is incorporated herein by reference.

BACKGROUND

The disclosed subject matter relates to a technique of delivering a mail.

A mail gateway has been more and more introduced into a mail system in recent years. The mail gateway has a function of receiving a mail, performing a prescribed processing to the received mail, and sending (relaying) the mail to a mail server as a destination. In this specification, a mail means information containing a message made up of a character, a graph, an image, a sound, a moving image, or the like which is sent or received to and from a personal computer, a mobile phone, a personal digital assistance, and the like, using, for example, a protocol for an email or a protocol for a mail used in a short message service or a multimedia messaging service.

In a mail system of a mobile communications carrier which provides data communication service for mobile phones or personal digital assistances, for example, a mail gateway converts a character code contained in a mail, an image attached thereto, or the like, and transmits the mail subjected to the conversion to a mail server as a destination. Further, in a mail system of a university or a business enterprise, a mail gateway is installed such that all transmitted and received mails pass through the mail gateway, to thereby perform filtering of spam mails or the like in order to improve security of a mail server.

Next is described a specific example of a processing performed by a mail gateway, assuming a case where a mail gateway in a mail system of a mobile communications carrier relays a mail.

The mail gateway receives a mail from a mobile phone as a sender, stores information on the received mail in a queue, and returns normal response information indicating that the mail has been successfully received, to the sender mobile phone. The mail gateway then relays the received mail to a mail transfer server (MTA: Message Transfer Agent) as a destination. If the relay has been successfully performed, the mail gateway deletes the information on the mail stored in the queue and terminates the processing.

A queue of a mail gateway is an area for temporarily storing information on a received mail and is configured by a volatile memory such as a RAM (Random Access Memory) or a nonvolatile memory such as a magnetic disk or a SSD (Solid State Drive). Such a queue makes it possible for a mail gateway to immediately respond to a mobile phone on a sending side or hold a mail until the mail has been successfully relayed to a mail transfer server.

On the other hand, if the relay has failed, the mail gateway performs a resend processing after an elapse of a prescribed period of time. However, if the mail transfer server as a destination is in a state of congestion because a trouble has occurred therein, or if a congestion occurs somewhere in a communication path to the destination mail transfer server, the mail gateway enters into the congestion state in which a queue is too full of mails waiting for being resent to receive any more new mails.

Japanese Laid-Open Patent Application, Publication No. 2005-269263 (see paragraphs 0048 through 0050) discloses a technique of avoiding such a congestion state. In Japanese Laid-Open Patent Application, Publication No. 2005-269263, a queue is provided for each of mail servers as destinations of mails, and congestion is controlled for each of the mail servers. With this configuration, if congestion occurs in a specific mail server, a queue which transmits a mail to the specific mail server having been in the congestion state controls reception of mails. From a viewpoint of the overall mail gateway, this makes it possible to limit an influence of the congestion only to a mail associated with the congested mail server.

SUMMARY

In a method disclosed in Japanese Laid-Open Patent Application, Publication No. 2005-269263, an operator is in charge of setting a queue for each mail server as a destination of a mail. It would not be possible for the operator to set a queue for each and every mail server as the destination on the Internet because some mail servers have been added and others deleted on a daily basis in these years. Thus, in a case where a mail sent to a mail server as a destination in which a queue has not yet been set brings about a state of congestion, a technique of limiting an influence of the congestion state is yet to be studied.

In light of the above-described problems, it is provided a technique in which, if a mail sent to a mail server as a destination in which no queue is set brings about a state of congestion, influence of the congestion state can be made limited.

A mail gateway collects, based on information contained in a mail waiting for being resent, statistical information for each of the information, to thereby obtain the collected number, and creates a provisional queue which sends a mail containing information having the collected number larger than an upper limit threshold. The mail gateway transfers a mail containing information having the collected number larger than the upper limit threshold, from among the mails waiting for being resent, to the provisional queue, and enters the mail into the provisional queue. The mail gateway enters, from among newly-received mails, a mail containing the information, into the provisional queue. The mail gateway also restricts an entry of a mail into a provisional queue if the provisional queue becomes a state of congestion. Further, the mail gateway stops entering a mail into a provisional queue, if the collected number of mails entered into the provisional queue is less than a lower limit threshold, and deletes the provisional queue when the provisional queue becomes empty without holding any mails.

According to the teaching herein, in a case where a mail sent to a mail server as a destination in which no queue is set brings about a state of congestion, influence of the congestion state can be made limited.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a diagram illustrating an example of queue management information according to the embodiment.

FIG. 7 is a diagram illustrating an example of group information on counting entries according to the embodiment.

FIG. 10A and FIG. 10B are diagrams each illustrating a specific example of information on counting entries according to the embodiment. FIG. 10A illustrates a case in which information to be collected is a queue length. FIG. 10B illustrating a case in which information to be collected is the number of timeouts.

FIG. 11 is a diagram illustrating an example of a processing flow of the mail gateway according to the embodiment.

DETAILED DESCRIPTION OF THE EXEMPLARY EMBODIMENT

<Outline>

An outline of operations of a mail gateway in this embodiment is described with reference to FIG. 1.

Figure 1:
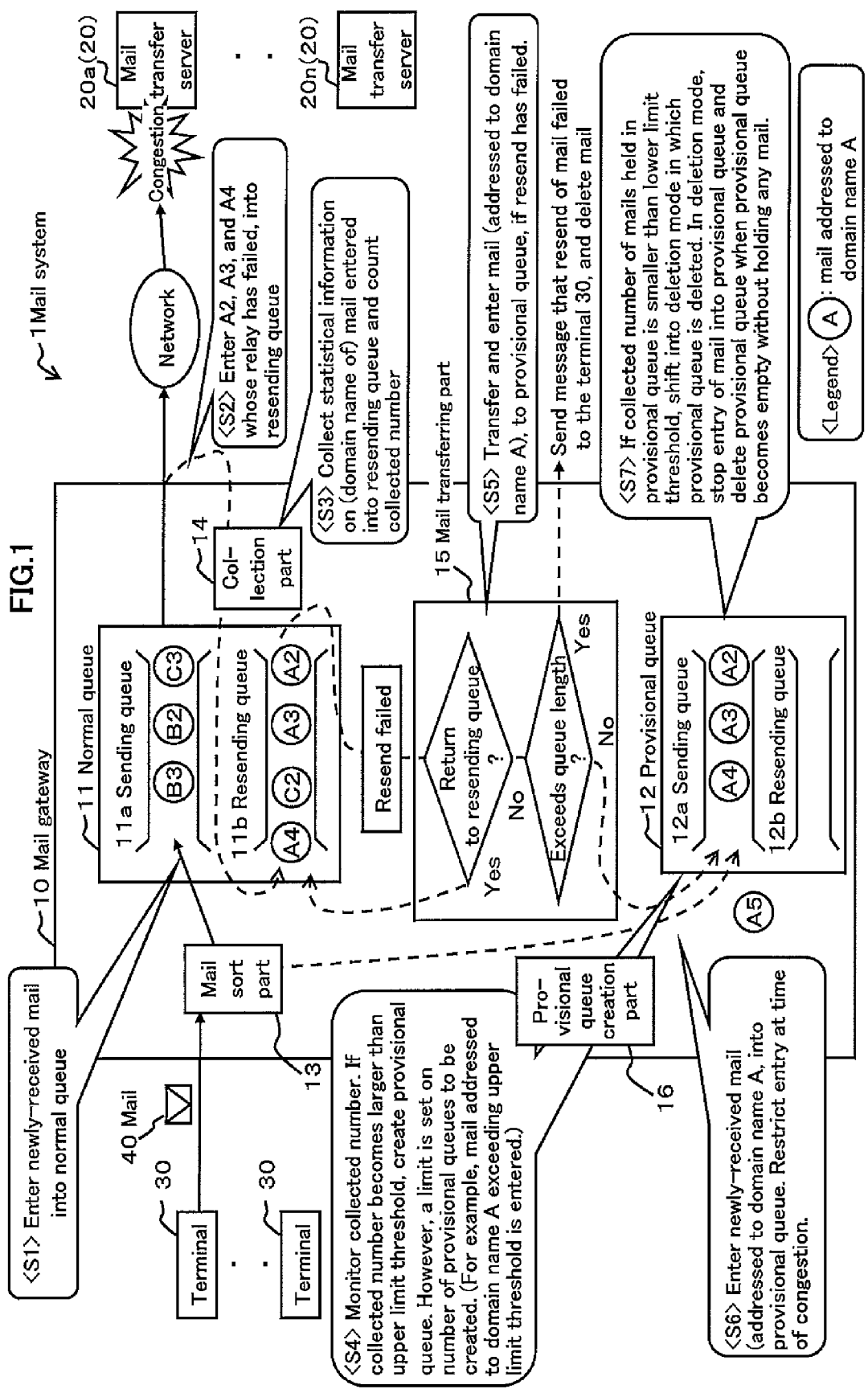
FIG. 1 is a diagram illustrating an outline of operations of a mail gateway according to an embodiment.

FIG. 1 illustrates a state in which a mail gateway 10 receives a mail 40 sent from a terminal 30, sorts the mail 40 into an appropriate queue at a mail sort part 13, and relays the mail 40 to a mail transfer server 20.

As shown in FIG. 1, the mail gateway 10 includes, as functions thereof, a normal queue (which may also be referred to as a first queue) 11, a provisional queue (which may also be referred to as a second queue) 12, a mail sort part 13, a collection part 14, a mail transferring part 15, and a provisional queue creation part 16. The normal queue 11 is constantly present. The provisional queue 12 is occasionally created or deleted.

The normal queue 11 includes a sending queue 11a and a resending queue 11b. The sending queue 11a has a function of, after the mail 40 received from the terminal 30 is entered thereinto, sending (relaying) the mail 40 to the mail transfer server 20 as a destination. The resending queue 11b has a function of, if the relay of the mail 40 has failed, holding the mail 40 as a pending mail to be sent later. The normal queue 11 receives an entry of the mail 40 which is to be delivered to one of a plurality of the mail transfer servers 20.

The provisional queue 12 includes a sending queue 12a and a resending queue 12b. The provisional queue 12 has a function of delivering the mail 40 containing specific information which is specified in advance by an operator or the like. The provisional queue 12 is created differently and separately from the normal queue 11. Note that, however, the sending queue 12a and the resending queue 12b have functions similar to those of the sending queue 11a and the resending queue 11b, respectively. The normal queue 11 is created in advance by an operator or the like, and the provisional queue 12 is created by the provisional queue creation part 16.

The mail sort part 13 has a function of sorting the mails 40 received from the terminal 30 such that any of the mails 40 containing the above-described specific information is entered into the provisional queue 12, and in turn, the mail 40 not containing the above-described specific information is entered into the normal queue 11. The mail sort part 13 also has a function of restricting an entry of the mail 40 into the provisional queue 12 when the provisional queue 12 becomes congested. The terms "become congested" herein mean a state in which a queue is too full to hold (receive) the newly-entered mail 40.

The collection part 14 has a function of collecting statistical information on specific information and counting the collected number which is a total number of pieces of the collected statistical information.

The mail transferring part 15 has a function of transferring the mail 40 which is held in the resending queue 11b and contains the specific information, to the provisional queue 12.

The provisional queue creation part 16 has functions of monitoring the collected number collected by the collection part and, if the collected number is larger than an upper limit threshold, creating the provisional queue 12.

Detailed operations of the normal queue 11, the provisional queue 12, the mail sort part 13, the collection part 14, the mail transferring part 15, and the provisional queue creation part 16 will be described hereinafter. Note that dashed arrows in FIG. 1 represent a flow of a processing of the mail 40 after a relay of the mail 40 has failed. FIG. 1 assumes a case where a domain name of a destination address of the mail 40 is used as the above-described specific information for collecting the statistical information.

In step S1, the mail sort part 13 of the mail gateway 10 enters the newly-received mail 40 into the normal queue 11. The normal queue 11 includes the sending queue 11a and the resending queue 11b. The sending queue 11a sends the newly-received mail 40 to the mail transfer server 20 via a network. In FIG. 1, for example, an encircled B3 indicates the mail 40 which was received third among the mails 40 addressed to a domain name B. A mail transfer server 20a represents a server for transferring the mail 40 addressed to a domain name A. Note that the reference numeral 20 may also be used to collectively represent the mail transfer servers 20a, . . . , 20n.

In step S2, because the mail transfer server 20a has become congested and relay of the mails 40 "A2, A3, and A4" addressed to the domain name A has thus failed, the mail gateway 10 enters the mails 40 whose relay failed, into the resending queue 11b.

In step S3, when the collection part 14 enters the unsuccessfully-relayed mails 40 into the resending queue 11b, the collection part 14 collects, based on the specific information (herein, the domain name) contained in the mails 40 entered into the resending queue 11b, statistical information for each of the specific information, and counts the collected number. The statistical information used herein includes, for example, a queue length and the number of timeouts. Details of how the collected number is used will be described hereinafter.

In step S4, the provisional queue creation part 16 monitors the collected number, and, if the collected number becomes larger than the upper limit threshold, creates the provisional queue 12. However, a limit is set on the number of provisional queues 12 to be created, because the newly-created provisional queue 12 necessarily occupies more or less some part of a memory. Further, if the specific information matches "set information" which has been previously set by an operator or the like and for which the provisional queue 12 shall not be created, then the provisional queue 12 is not created accordingly. It is assumed herein that the set information on no setting of the provisional queue 12 (which corresponds to key information 810*a*, 810*b*, . . . shown in FIG. 9) (the key information 810*a*, 810*b*, . . . may be collectively referred to as key information 810) is described in a queue creation exclusion list 116 shown in FIG. 4. However, in the case shown in FIG. 1, the provisional queue creation part 16 creates the provisional queue 12 into which the mail 40 addressed to the domain name A is entered.

In step S5, the mail transferring part 15 transfers the mail 40 addressed to the domain name A, to the provisional queue 12, if a resend thereof has failed, and enters the mail 40 into the provisional queue 12. More specifically, the mail transferring part 15: extracts the mail 40 addressed to the domain name A from among the mails 40 whose resend has failed; transfers the mail 40 addressed to the domain name A to the provisional queue 12 and enters the mail 40 thereinto; and returns any mail 40 other than that addressed to the domain name A, to the resending queue 11*b*. At the time of the transfer, if the queue length of the provisional queue 12 exceeds a limit thereof, the mail transferring part 15 stops transferring the mail 40 addressed to the domain name A which is about to be transferred to the provisional queue 12, sends a message that a resend of the mail 40 has failed to the terminal 30, and deletes the mail 40.

In step S6, the mail sort part 13 enters the newly-received mail 40 addressed to the domain name A, into the provisional queue 12. However, if the provisional queue 12 has entered into the state of congestion, the mail sort part 13 restricts an entry of the mail 40 into the provisional queue 12. The term "restrict" used herein includes a complete prohibition of the entry.

In step S7, if the collected number of the mails 40 held in the provisional queue 12 is smaller than a lower limit threshold, the mail gateway 10 shifts into a deletion mode in which the provisional queue 12 is deleted. More specifically, the mail gateway 10 stops an entry of the mail 40 into the provisional queue 12 in such a way as to enter the newly-received mail 40 addressed to the domain name A into the normal queue 11. The mail gateway 10 then deletes the provisional queue 12 when held in the provisional queue 12 becomes empty without holding any mail 40 therein.

As described above, the mail gateway 10 with the aforementioned configuration can prevent the normal queue 11 from entering into the state of congestion, in a case where the mail 40 containing specific information (for example, the mail 40 addressed to the domain name A) is about to cause the state of congestion on the normal queue 11. The prevention can be achieved by creating the provisional queue 12 which performs a delivery of the mail 40 containing the specific information. In another case where a state of congestion is brought about in the provisional queue 12 which performs the delivery of the mail 40 containing the specific information, the mail gateway 10 can restrict influence of the state of congestion only to the provisional queue 12 by restricting an entry of the mail 40 into the provisional queue 12.

<Mail System>

Figure 2:
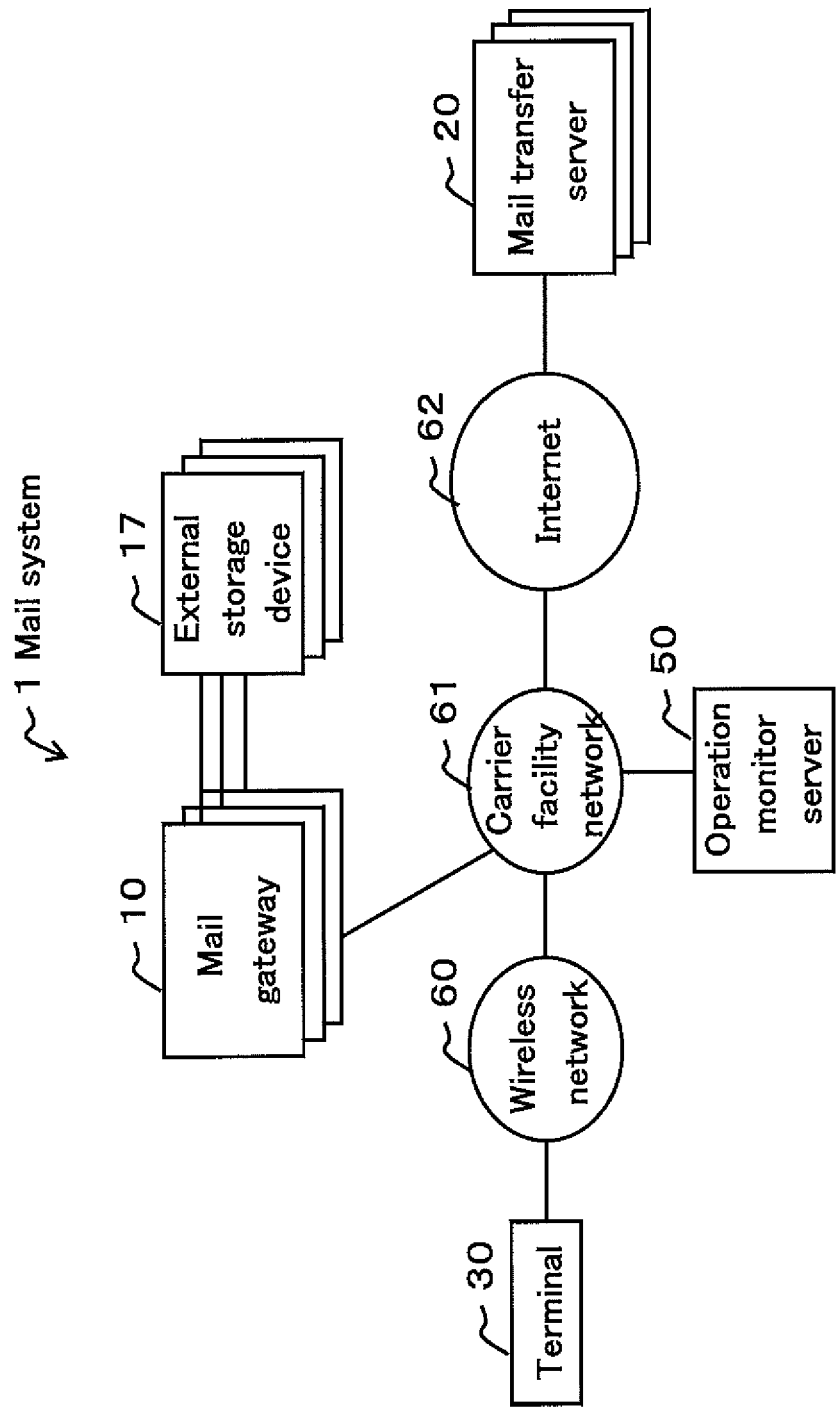
FIG. 2 is a diagram illustrating an example of a configuration of a mail system according to the embodiment.

Next is described a configuration of a mail system in this embodiment with reference to FIG. 2 (see also FIG. 1 where necessary). FIG. 2 exemplifies a configuration of a mail system used in a mobile communications carrier.

As shown in FIG. 2, a mail system 1 includes the mail gateway 10, an external storage device 17, the mail transfer server 20, the terminal 30, and an operation monitor server 50. The terminal 30 and the mail transfer server 20 are connected to each other via a wireless network 60, a carrier facility network 61, and the Internet 62. The mail gateway 10 and the operation monitor server 50 are each connected to the carrier facility network 61.

The terminal 30 is a terminal device capable of data communication such as a mobile phone unit and a personal computer. The wireless network 60 is a wireless network managed by the mobile communications carrier. The carrier facility network 61 is a network and a network facility for relaying a communication from the wireless network 60 to the Internet 62 or the mail gateway 10. The wireless network 60 and the carrier facility network 61 are managed by the mobile communications carrier in charge of the mail gateway 10.

The mail transfer server 20 has a function of sending and receiving the mail 40 to and from the mail gateway 10 via the Internet 62. More specifically, the mail transfer server 20 performs a processing of transferring the mail 40 in other mobile communications carrier or provider in charge of the mail transfer server 20, to the mail gateway 10, and a processing of relaying the mail 40 received from the mail gateway 10 to other mobile communications carrier or provider.

The mail gateway 10 is installed on the carrier facility network 61. The mail gateway 10 receives the mail 40 which is sent from the terminal 30 to the carrier facility network 61, and, if the mail 40 is addressed to outside of the carrier facility network 61 (that is, to other mobile communications carrier or provider), relays the mail 40 to the mail transfer server 20. In this embodiment, a plurality of the mail gateways 10 may be provided to share load thereon.

The external storage device 17 is embodied by a semiconductor storage unit, a hard disk, or the like and has a function of providing a backup of information stored in the mail gateway 10.

In this embodiment, a communication protocol between the mail gateway 10 and the terminal 30 is assumed to be the SMTP (Simple Mail Transfer Protocol) or the ESMTP (Extended SMTP). In addition to the above, the HTTP (Hypertext Transfer Protocol), the IMAP (Internet Message Access Protocol), the POP (Post Office Protocol), the MMS (Multimedia Messaging Service), or the like is also applicable as the protocol.

The operation monitor server 50 has functions of receiving an alert at a time of a congestion state or of a new creation of the provisional queue 12, from the mail gateway 10, and of displaying collected information, to thereby monitor the mail gateway 10.

<Configuration of Mail Gateway>

Figure 3:
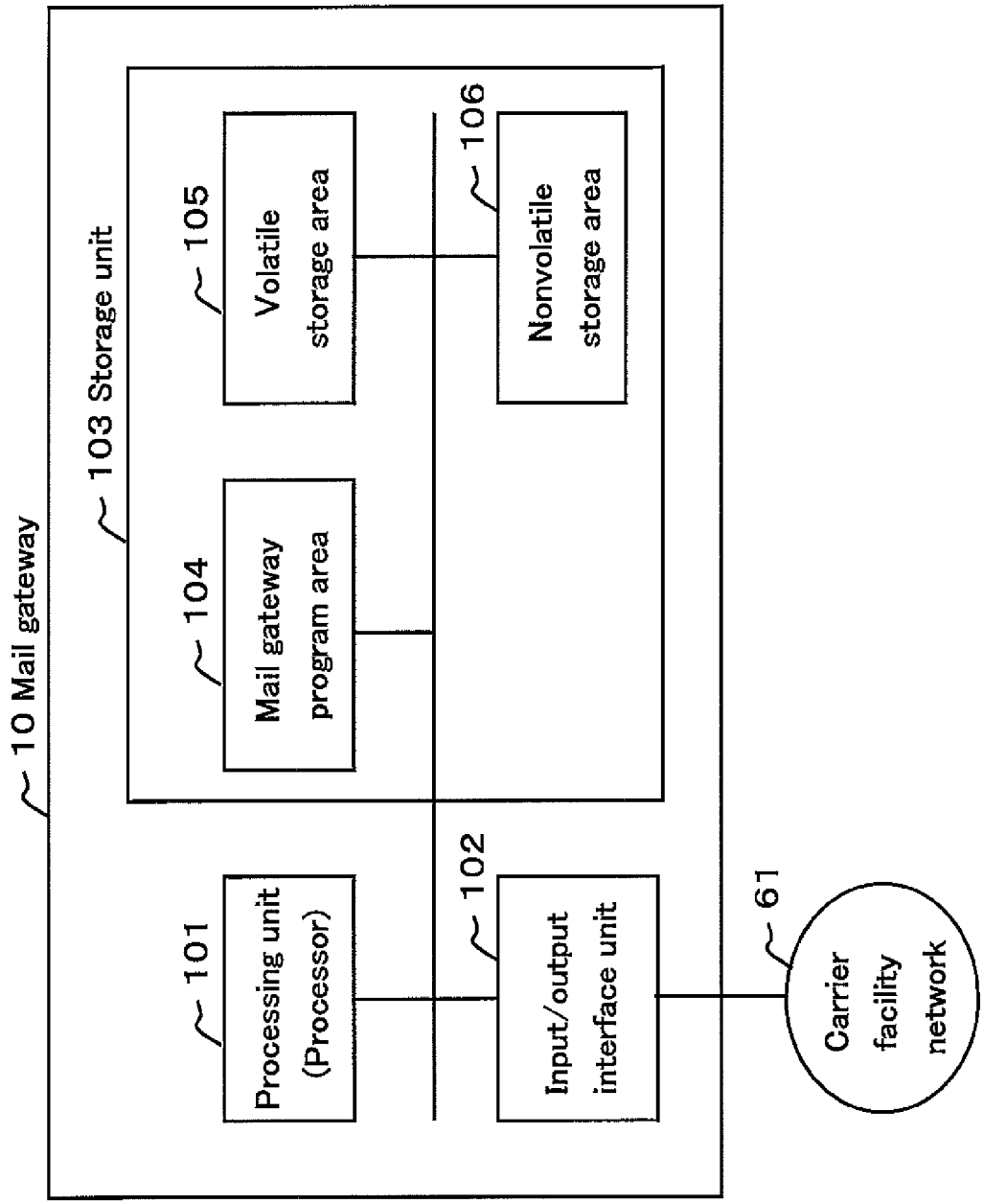
FIG. 3 is a diagram illustrating an example of a hardware configuration of the mail gateway according to the embodiment.

FIG. 3 illustrates a hardware configuration of an information processor (for example, a computer) which realizes the mail gateway 10.

The information processor includes: a processing unit (processor) 101; an input/output interface unit 102 that sends and receives information to and from the carrier facility network 61; a storage unit 103; and an internal communication line connecting the above-mentioned components, such as a bus.

The storage unit 103 includes: a mail gateway program area 104 that stores therein a mail gateway program executed by the processing unit 101; and a volatile storage area 105 and a nonvolatile storage area 106 which are areas other than the mail gateway program area 104 and store therein a data inputted or outputted by the mail gateway program. The processing unit (processor) 101 has a function of running a program stored in the storage unit 103.

Figure 4:
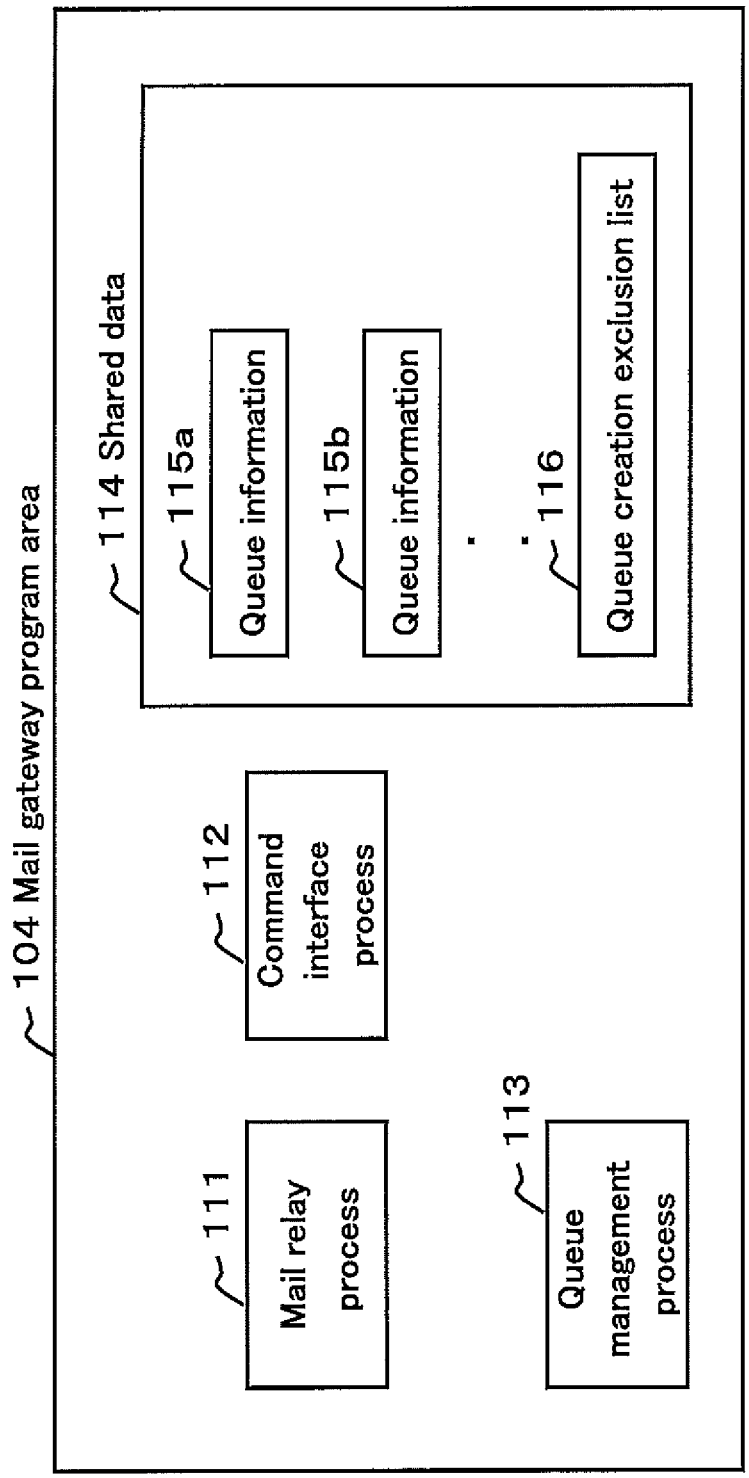
FIG. 4 is a diagram illustrating a process configuration in a mail gateway program area according to the embodiment.

FIG. 4 illustrates a configuration of a program which is stored in the mail gateway program area 104 and realizes processes executed in the mail gateway 10 (see FIG. 1 where appropriate).

As shown in FIG. 4, the program area 104 which embodies the mail gateway 10 includes: a program realizing a mail relay process 111; a program realizing a command I/F (interface)

process 112; a program realizing a queue management process 113; and a shared data 114.

The mail relay process 111 embodies the normal queue 11, the provisional queue 12, the mail sort part 13, the collection part 14, the mail transferring part 15, and the provisional queue creation part 16, which are shown in FIG. 1.

The command I/F (interface) process 112 is embodied by the GUI (Graphical User Interface) or the like and is used when an operator of the mobile communications carrier sets a prescribed value in the shared data 114 in advance so as to set an operation of the mail gateway 10.

The queue management process 113 has a function of performing a read or a write of the queue information 115 stored in the shared data 114.

The shared data 114 stores therein queue information 115a, 115b, ... (which may also be collectively referred to as queue information 115) on the normal queue 11 and on the provisional queue 12, and a queue creation exclusion list 116.

Figure 5:
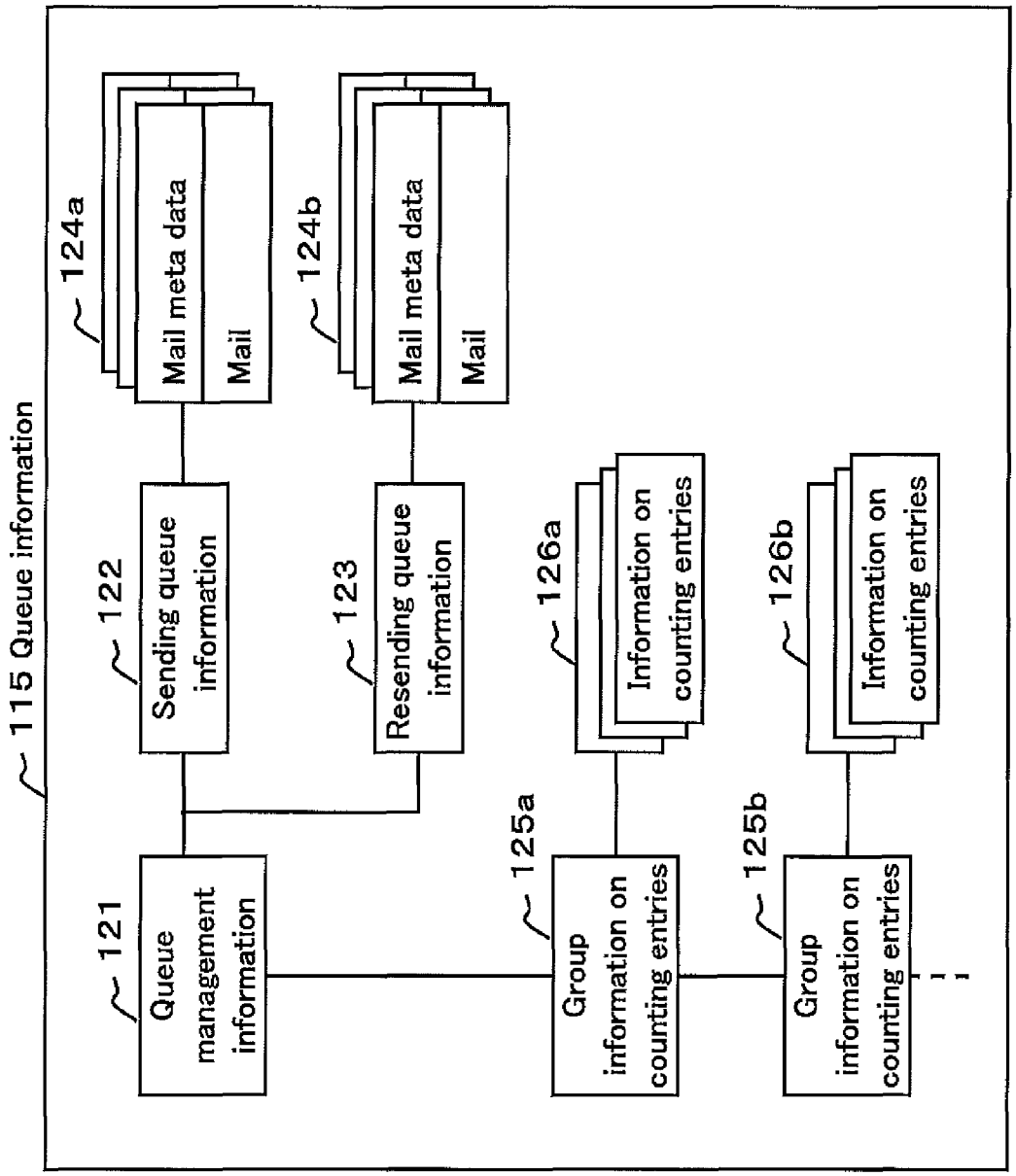
FIG. 5 is a diagram illustrating an example of queue information according to the embodiment.

Next are described details of the queue information 115 with reference to FIG. 5.

The queue information 115 stores therein various types of information in a hierarchical form with queue management information 121 at the top thereof. The queue information 115 has a backup thereof stored in the external storage device 17 (see FIG. 1).

The queue management information 121 manages information on states of the normal queue 11 and the provisional queue 12. More specifically, the queue management information 121 stores therein: sending queue information 122 which is information on the sending queues 11a, 12a; and resending queue information 123 which is information on the resending queues 11b, 12b. The sending queue information 122 and the resending queue information 123 store therein a mail meta data 124a and a mail meta data 124b, respectively (which may also be collectively referred to as a mail meta data 124). The mail meta data 124 stores therein information on the mail 40 held in the normal queue 11 or the provisional queue 12. If the mail 40 is held in the normal queue 11, the queue management information 121 holds group information on counting entries 125 which is information used in determining whether or not is the provisional queue 12 created. If the mail 40 is held in the provisional queue 12, the queue management information 121 does not hold any group information on counting entries 125.

The group information on counting entries 125 is also used in order for the collection part 14 to collect statistical information on the mail 40. The terms "grouped information" used herein mean information obtained by classifying information contained in the mail 40 by broad categories. Some examples of the grouped information include a queue length, the number of timeouts, and information commonly contained in headers of mails sent to the specific mail transfer server 20. Note that the number of the group information on counting entries 125 is set so as to be equal to or less than a prescribed value.

The group information on counting entries 125 is updated at the time when the collection part 14 collects statistical information on the mail 40. More specifically, the group information on counting entries 125 is updated when a relay (sending) of the mail 40 has failed, which is after the mail 40 is taken out of the sending queue 11a, or after the mail 40 is taken out of the resending queue 11b. The mail 40 held in the resending queue 11b is subjected to a resend processing at periodic intervals. Based on the intervals, information which appears less frequently (that is, which has a small collected number) is replaced by information which appears more frequently (that is, which has a large collected number).

The group information on counting entries 125 further stores therein information on counting entries 126. The information on counting entries 126 is information obtained by classifying the group information on counting entries 125 by small categories and collecting the classified information for each key information.

FIG. 6 illustrates an example of the queue management information 121. The queue management information 121 includes a queue ID 601, a queue name 602, a queue size 603, an expiration time 604, a resend time 605, the number of resends 606, a maximum throughput 607, a connection upper limit value 608, and a restriction flag 609.

The queue ID 601 is identification information identifying a created queue.

The queue name 602 is a name given to the created queue.

The queue size 603 indicates an upper limit on the number of messages which can be stored in a queue. Additionally, a total size of messages which can be stored in a queue can be specified to the queue size 603.

The expiration time 604 is a time during which a message can stay in the queue.

The resend time 605 is a time from when the message is held until when the message is resent.

The number of resends 606 indicates an upper limit number of times up to which times the mail 40 stored in the queue can be resent.

The maximum throughput 607 indicates an upper limit number of a throughput.

The connection upper limit value 608 indicates an upper limit number of connections (sessions) which can be connected simultaneously.

The restriction flag 609 indicates a flag for stopping sending and/or receiving a message and is set by an operator.

FIG. 7 illustrates an example of the group information on counting entries 125. The group information on counting entries 125 includes a group ID 701, a collection target 702, provisional queue creation information 703, an upper limit threshold 704, a lower limit threshold 705, an upper limit number of provisional queues 706, the number of created provisional queues 707, a control flag 708, a counting target flag 709, and an option 710.

The group ID 701 is identification information for identifying a group.

The collection target 702 indicates information commonly contained in the mails 40 belonging to the group. Some examples of the collection target 702 include a queue length, the number of timeouts, information contained in headers of mails sent to the specific mail transfer server 20.

The provisional queue creation information 703 is information used in creating the provisional queue 12.

The upper limit threshold 704 is information used in determining whether or not the provisional queue 12 is created. If the collected number of the mails 40 to be transferred to the provisional queue 12 and entered thereinto becomes larger than the upper limit threshold 704, the provisional queue 12 is determined to be created.

The lower limit threshold 705 is information used in determining whether or not the provisional queue 12 is deleted. If the collected number of the mail 40 entered in the provisional queue 12 is less than the lower limit threshold 705, it is determined that a shift into a deletion mode for deleting the provisional queue 12 is to be performed.

The upper limit number of provisional queues 706 indicates an upper limit number of the provisional queues 12 to be newly created.

The number of created provisional queues 707 indicates the number of the provisional queues 12 which have already been created.

The control flag 708 is a flag set by an operator and indicates an instruction that the provisional queue 12 shall not be created or shall not be deleted.

The counting target flag 709 is a flag set by an operator and indicates whether or not the group information on counting entries 125 is a target to be collected.

The option 710 is set by an operator where appropriate.

Figures 8, 9:
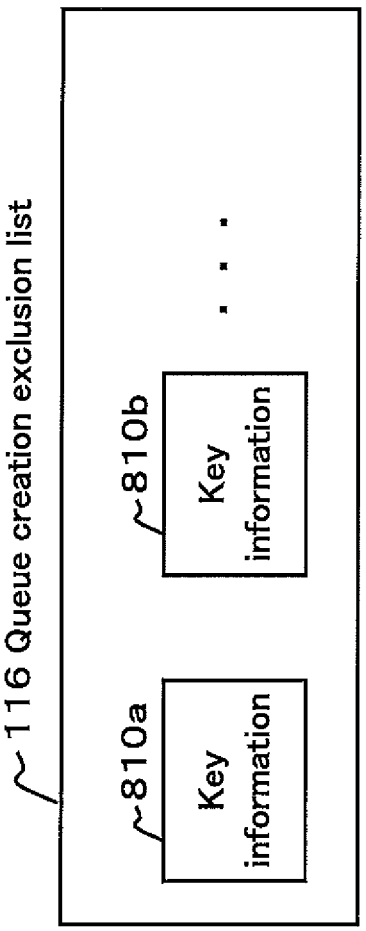
FIG. 8 is a diagram illustrating an example of information on counting entries according to the embodiment.
FIG. 9 is a diagram illustrating an example of a queue creation exclusion list according to the embodiment.

FIG. 8 illustrates an example of the information on counting entries 126. The information on counting entries 126 includes a key information ID 801, key information 802, the collected number 803, an upper limit threshold 804, a lower limit threshold 805, a status flag 806, an updated date and time 807, and an option 808.

The key information ID 801 is identification information identifying key information used in collecting statistical information of the mail 40.

The key information 802 is information used as information key in collecting statistical information of the mail 40. The key information 802 is extracted from, for example, information stored in a header of the mail 40.

The collected number 803 is the number obtained by counting the statistical information of the mail 40 which includes the key information 802.

The upper limit threshold 804 indicates an upper limit threshold set to the collected numbers of respective pieces of the key information 802. The upper limit threshold 804 is set, for example, such that the upper limit threshold 704 is allocated among plural pieces of the key information 802 in a group. That is, the upper limit threshold 704 of the group information on counting entries 125 is equal to a sum obtained by adding up the upper limit thresholds 804 of the information on counting entries 126.

The lower limit threshold 805 indicates a lower limit threshold set to the collected numbers of respective pieces of the key information 802. The lower limit threshold 805 is set, for example, such that the lower limit threshold 705 is allocated among plural pieces of the key information 802 in a group. That is, the lower limit threshold 705 of the group information on counting entries 125 is equal to a sum obtained by adding up the lower limit thresholds 805 of the information on counting entries 126.

The status flag 806 is a flag set by an operator and represents a status of either the provisional queue 12 has already been created or has not yet been created.

The updated date and time 807 indicates a date and time when the information on counting entries 126 is updated.

The option 808 is set by an operator where appropriate.

FIG. 9 illustrates an example of the queue creation exclusion list 116. The queue creation exclusion list 116 includes therein plural pieces of key information 810. The key information 810 is set by an operator or the like. For example, a domain name, a subdomain name, or only a portion of a domain name can be set as the key information 810. Even if the collected number becomes larger than the upper limit threshold 704, the collection part 14 creates no provisional queue 12 if the key information of interest matches the key information 810 in the queue creation exclusion list 116.

FIG. 10A and FIG. 10B each illustrate a specific example of the information on counting entries 126.

FIG. 10A illustrates a case in which information to be collected is a queue length. The queue length used herein is the number of messages stored in a queue. For example, columns of the first line include: a key information ID 901 of "0001"; key information 902 of "AAA"; the collected number (the queue length) 903 of "1010"; an upper limit threshold (of the queue length) 904 of "1000"; a lower limit threshold (of the queue length) 905 of "200"; a status flag 906 of "queue created"; an updated date and time 907 of "2011/09/20 hh:mm:ss"; and an option (a throughput and a maximum value) 908 of "20, 1000". In the first line, because a value of the collected number 903 exceeds a value of the upper limit threshold 904, the provisional queue 12 has been created, resulting in the status flag 906 of "queue created".

Additionally, a total size of messages in a queue can be specified as the queue length.

FIG. 10B illustrates a case in which information to be collected is the number of timeouts. The case takes account of problems on a network. For example, columns of the first line include: a key information ID 911 of "0001"; key information 912 of "AAA"; the collected number (the number of timeouts) 913 of "103"; an upper limit threshold (of the number of timeouts) 914 of "100"; a lower limit threshold (of the number of timeouts) 915 of "20"; a status flag 916 of "queue created"; an updated date and time 917 of "2011/09/20 hh:mm:ss"; and an option (a start time of timeout detection) 918 of "2011/09/20 hh:mm:ss". In the first line, because a value of the collected number 913 exceeds a value of the upper limit threshold 914, the provisional queue 12 has been created with the status flag 916 of "queue created".

<Processing Flow>

Next is described an example of a processing flow of the mail gateway 10 with reference to FIG. 11 (see also FIG. 1 where necessary). Note that FIG. 11 illustrates a case in which any of the mails 40 contain specific key information.

In step S1001, the mail gateway 10 receives the mail 40 sent from the terminal 30.

In step S1002, the mail gateway 10 stores the received mail 40 in the external storage device 17.

In step S1003, the mail gateway 10 receives response information indicating that the storage has been successfully completed, from the external storage device 17.

In step S1004, the mail gateway 10 sends normal response information indicating that the mail 40 has been successfully received, to the terminal 30.

In step S1005, the mail gateway 10 sends (relays) the mail 40 to the mail transfer server 20. At this time, however, the mail transfer server 20 is in a state of congestion, and thus, the sent mail 40 enters into an unsuccessfully relayed state.

In step S1006, the mail gateway 10 stores the unsuccessfully relayed mail 40 in the resending queue 11*b*.

In step S1007, the mail gateway 10 increments the collected number 803 of the information on counting entries 126 (see FIG. 8).

In step S1008, the mail gateway 10 determines whether or not the collected number 803 exceeds the upper limit threshold 804. If the collected number 803 is not determined to exceed the upper limit threshold 804 (if No in step S1008), the processing returns to step S1001 and performs steps similar to steps S1001 to S1008. If the collected number 803 is determined to exceed the upper limit threshold 804 (if Yes in step S1008), the processing advances to step S1009.

In step S1009, the mail gateway 10 creates the provisional queue 12.

In step S1010, the mail gateway 10 receives the mail 40 sent from the terminal 30.

In step S1011, the mail gateway 10 selects the provisional queue 12 based on the key information 802 of the received mail 40. The mail gateway 10 then stores the received mail 40 in the selected provisional queue 12.

In step S1021, the mail gateway 10 sends (relays) the mail 40 to the mail transfer server 20. This time, the congestion state of the mail transfer server 20 has been cleared, and thus, the sent mail 40 enters into a successfully relayed state.

In step S1022, the mail gateway 10 decrements the collected number 803 of the information on counting entries 126 (see FIG. 8). Note that the step of decrementing the collected number 803 is performed not only in step S1022 but also when the mail 40 stored in the resending queue 11b in step S1006 has been successfully resent or when the mail 40 stored in the resending queue 11b has been moved to the provisional queue 12. Further, the mail gateway 10 may skip the collection associating the provisional queue 12 with the information on counting entries 126, that is, the mail gateway 10 may skip step S1022. Also in that case, however, the decrementing step is still performed when the mail 40 stored in the resending queue 11b in step S1006 has been successfully resent or when the mail 40 stored in the resending queue 11b has been moved to the provisional queue 12.

In step S1023, the mail gateway 10 deletes storage information on the already-sent mail 40. More specifically, the mail gateway 10 deletes storage information concerning the sent mail 40 which is stored in the queue information 115 (see FIG. 5) or backup information concerning the already-sent mail 40 which is stored in the external storage device 17.

In step S1024, the mail gateway 10 determines whether or not the collected number 803 becomes less than the lower limit threshold 805. If the collected number 803 is not determined to become less than the lower limit threshold 805 (if No in step S1024), the processing advances to step S1010 and performs steps similar to steps S1010, S1011, and S1021 to S1024. If the collected number 803 is determined to become less than the lower limit threshold 805 (if Yes in step S1024), the processing advances to step S1025.

In step S1025, the mail gateway 10 shifts into a deletion mode in which the provisional queue 12 is deleted.

In step S1026, the mail gateway 10 deletes the provisional queue 12 if the provisional queue 12 becomes empty.

Figure 12:
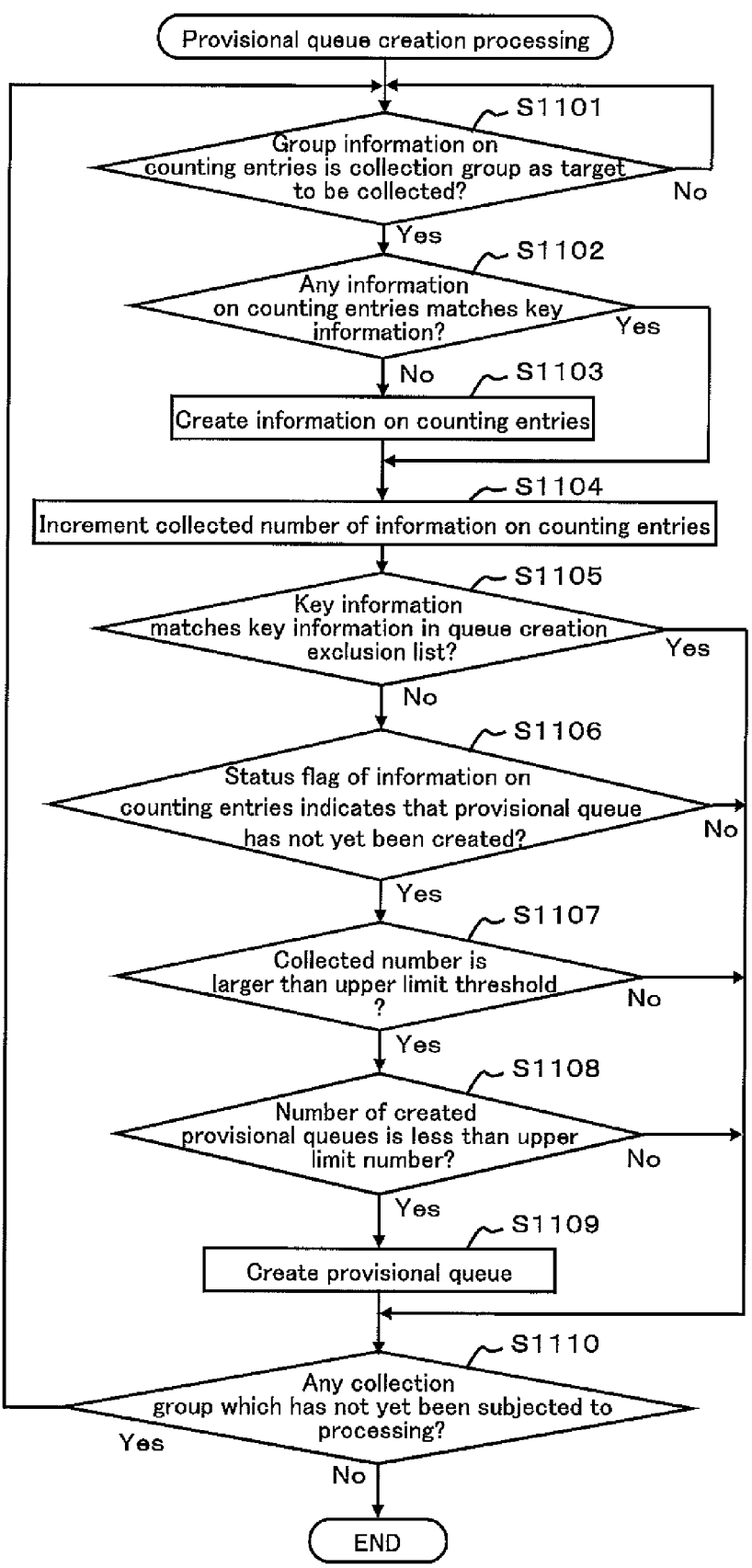
FIG. 12 is a diagram illustrating an example of a flowchart of a provisional queue creation processing according to the embodiment.

FIG. 12 is a flowchart illustrating details of a provisional queue creation processing shown in steps S1007 to S1009 of FIG. 11 (see FIG. 7 and FIG. 8 where appropriate).

In step S1101, the mail gateway 10 determines whether or not the group information on counting entries 125 in the mail 40 is a collection group as a target to be collected. More specifically, the mail gateway 10 performs collection of statistical information on the mail 40, if the counting target flag 709 (see FIG. 7) of the group information on counting entries 125 (see FIG. 7) is set so as to regard the group information on counting entries 125 as a target to be collected.

If the group information on counting entries 125 is not determined to be the collection group as the collection target (if No in step S1101), the processing returns to step S1101, and the mail gateway 10 performs the determination to the next collection group. On the other hand, if the group information on counting entries 125 is determined to be the collection group as the collection target (if Yes in step S1101), the processing advances to step S1102.

In step S1102, the mail gateway 10 determines whether or not there is any information on counting entries 126 which is matches the key information 802 from among information contained in the mail 40. More specifically, the mail gateway 10 references the key information 802 in the information on counting entries 126 and searches for the information on counting entries 126 on the matched key information 802.

If no information on counting entries 126 is determined to match the key information 802 (if No in step S1102), the processing advances to step S1103. On the other hand, if the information on counting entries 126 which matches the key information 802 is determined to be present (if Yes in step S1102), the processing skips step S1103 and advances to step S1104.

In step S1103, the mail gateway 10 newly creates the information on counting entries 126 which matches the key information 802.

In step S1104, the mail gateway 10 increments the collected number 803 of the information on counting entries 126.

In step S1105, the mail gateway 10 determines whether or not key information contained in the mail 40 matches the key information 810 in the queue creation exclusion list 116. If the key information contained in the mail 40 is not determined to match the key information 810 (if No in step S1105), the processing advances to step S1106. On the other hand, if the key information contained in the mail 40 is determined to match the key information 810 (if Yes in step S1105), the processing advances to step S1110.

In step S1106, the mail gateway 10 determines whether or not the status flag 806 of the information on counting entries 126 indicates that the provisional queue 12 has not yet been created. More specifically, the mail gateway 10 references the information on counting entries 126 as shown in FIG. 10 and determines whether the status flag 905 thereof indicates "the provisional queue 12 has not yet been created" or "the provisional queue 12 has already been created".

If the status flag 905 is determined to indicate the "not yet created" (if Yes in step S1106), the processing advances to step S1107. On the other hand, if the status flag 905 is not determined to indicate the "not yet created" (if No in step S1106), the processing advances to step S1110.

In step S1107, the mail gateway 10 determines whether or not the collected number 803 is larger than the upper limit threshold 804.

If the collected number 803 is determined to be larger than the upper limit threshold 804 (if Yes in step S1107), the processing advances to step S1108. On the other hand, if the collected number 803 is not determined to be larger than the upper limit threshold 804 (if No in step S1107), the processing advances to step S1110.

In step S1108, the mail gateway 10 determines whether or not the number of created provisional queues 707 of the provisional queue 12 is less than the upper limit number of provisional queues 706. More specifically, the mail gateway 10 makes the determination by referencing the number of created provisional queues 707 and the upper limit number of provisional queues 706 of FIG. 7.

If the number of created provisional queues 707 is determined to be less than the upper limit number of provisional queues 706 (if Yes in step S1108), the processing advances to step S1109. On the other hand, if the number of created provisional queues 707 is not determined to be less than the upper limit number of provisional queues 706 (if No in step S1108), the processing advances to step S1110.

In step S1109, the mail gateway 10 creates the provisional queue 12.

In step S1110, the mail gateway 10 determines whether or not there is any collection group which has not yet been subjected to the processing. If there is any collection group which has not yet been subjected to the processing (if Yes in step S1110), the processing returns to step S1101. On the other hand, if there is no collection group which has not yet been subjected to the processing (if No in step S1110), the processing terminates, and the mail 40 to be entered into the resending queue 11b next is subjected to the processing starting from step S1101.

In this embodiment, as described above, the mail gateway 10 collects, for each specific information contained in the mail 40 to be entered into the resending queue 11b, statistical information of the specific information. The mail gateway 10 then creates the provisional queue 12 which performs a send of the mail 40 whose collected number 803 is larger than the upper limit threshold 804, based on the collected number 803. That is, the case in which the collected number 803 is larger than the upper limit threshold 804 corresponds to a case in which there is a possibility that a state of congestion occurs. If the provisional queue 12 enters into the congestion state, an entry of the mail 40 is restricted. With the configuration as described above, if the mail 40 containing the specific information causes the congestion state, the mail gateway 10 can limit influence of the congestion state only to the provisional queue 12 in which the congestion state has occurred. That is, if the mail 40 sent to the mail transfer server 20 as a destination whose queue has not been set brings about the congestion state, the mail gateway 10 can limit influence of the congestion state.

In this embodiment, the mail system 1 shown in FIGS. 1 and 2 is assumed to have the configuration used in a mobile communications carrier. However, operations of the mail gateway 10 can also be applied to mail systems in universities and enterprises, besides mobile communications carriers. If the mail gateway 10 is used in a mail system for those other than the mobile communications carriers, it is only necessary to replace the mail transfer server 20 shown in FIGS. 1 and 2 by a mail server as a destination.

In this embodiment, a queue length and a number of timeouts are exemplified as the collected number. However, other numerical numbers may also be used such as the number of the mails 40, a change rate of statistical information, and a computable value which is contained in information obtained in response to a failure in a mail server as a destination or in a network.

Although the present disclosure has been described with reference to example embodiments, those skilled in the art will recognize that various changes and modifications may be made in form and detail without departing from the spirit and scope of the claimed subject matter.

We claim:

1. A mail gateway relaying a mail received, the mail gateway comprising: a processor and memory: a first queue including a sending queue which holds a plurality of mails set to be sent to a destination and a resending queue which holds a plurality of mails to be relayed, each having respective destinations set within and having failed to be relayed to respective destinations; wherein, the mail gateway collects, from the plurality of mails held in the resending queue, statistical information for each destination set in the plurality of mails, the statistical information having a numerical value; when the mail gateway determines that one or more of the destinations of the mails set to be sent has a collected number of statistical information more than a pre-set upper limit threshold, the mail gateway: creates one or more second queues, each of the one or more second queues holding the mail in which the one or more corresponding destinations of interest are set; and transfers, from among the plurality of mails having failed to be relayed to respective destinations, the mail having the one or more destinations determined to have the collected number of the statistical information more than the pre-set upper limit threshold, to the second queue; and when the mail gateway determines that the collected number of information for each of the one or more second queues has less than a pre-set lower limit threshold, the mail gateway stops the transfer of the mail to the one or more second queues having the corresponding destination; and after the transfer is stopped and when the second queue having the corresponding destination becomes empty, the mail gateway deletes the second queue having the corresponding destination.

2. The mail gateway according to claim 1, wherein the provisional queue creation part further: counts the number of the second queues having been created; if when the number of the created second queues is less than a pre-set upper limit threshold of provisional queues to be created, the provisional queue creation part creates another second queue; and when the number of the created second queues is equal to or more than the upper limit threshold, the provisional queue creation part stops creating another second queue.

3. The mail gateway according to claim 1, further comprising a mail sort part that enters a mail containing the information including the collected number having been determined to be more than the upper limit threshold, from among one or more newly-received mails, into the second queue.

4. The mail gateway according to claim 3, wherein, when the second queue becomes a state of congestion, the mail sort part restricts an entry of a mail containing the information including the collected number having been determined to be more than the upper limit threshold, into the second queue.

5. The mail gateway according to claim 1, wherein the collected number is a queue length or the number of timeouts.

6. A mail delivery method performed by a mail gateway which relays a mail received, the mail gateway having a first queue that includes a sending queue which holds a plurality of mails set to be sent to a destination and a resending queue which holds a plurality of mails to be relayed, each having respective destinations set within and having failed to be relayed to respective destinations, the mail delivery method comprising: a collection step of collecting, from the plurality of mails held in the resending queue, statistical information for each destination set in the plurality of mails; a provisional queue creation step of determining when one or more destinations of the mails set to be sent has a collected number of the statistical information collected by the collection part that is more than a pre-set upper limit threshold, and, when the collected number corresponding to the one or more destinations is determined to be more than the upper limit threshold, creating one or more second queues, each of the one or more second queues holding the mail in which the one or more corresponding destinations of interest are set; and a mail transferring step of transferring, from among the plurality of mails having failed to be relayed to respective destinations, having the one or more destinations determined to have the collected number of the statistical information more than the pre-set upper limit threshold, to the second queue, and when the mail gateway determines that the collected number of information for each the one or more second queues has less than a pre-set lower limit threshold, stopping the transfer of the mail to the one or more second queues having the corresponding destination, and after the transfer is stopped and when the second queue having the corresponding destination becomes empty, deleting the second queue having the corresponding destination.

7. The mail delivery method according to claim 6, wherein, in the provisional queue creation step, further:
the number of the second queues which have already been created is counted;
when the number of the already-created second queues is less than a previously-set upper limit threshold of provisional queues to be created, another second queue is created; and
when the number of the already-created second queues is equal to or more than the upper limit threshold, creation of another second queue is stopped.

8. The mail delivery method according to claim 6, further comprising a mail sorting step of entering a mail containing the information including the collected number which has been determined to be more than the upper limit threshold, from among one or more newly-received mails, into the second queue.

9. The mail delivery method according to claim 8, wherein, in the mail sorting step, further, when the second queue becomes a state of congestion, an entry of a mail containing the information including the collected number having been determined to be more than the upper limit threshold, into the second queue is restricted.

10. The mail delivery method according to claim 6, wherein the collected number is a queue length or the number of timeouts.

11. A non-transitory computer-readable medium embodying a program to execute the mail delivery method according to claim 6.

12. A non-transitory computer-readable medium embodying a program to execute the mail delivery method according to claim 7.

13. A non-transitory computer-readable medium embodying a program to execute the mail delivery method according to claim 8.

14. A non-transitory computer-readable medium embodying a program to execute the mail delivery method according to claim 9.

15. A non-transitory computer-readable medium embodying a program to execute the mail delivery method according to claim 10.

* * * * *